US008988453B2

(12) United States Patent
Kang (10) Patent No.: US 8,988,453 B2
(45) Date of Patent: Mar. 24, 2015

(54) STEREOSCOPIC IMAGE DISPLAY DEVICE AND DRIVING METHOD THEREOF (75) Inventor: Dongwoo Kang, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 82 days.

(21) Appl. No.: 13/330,875

(22) Filed: Dec. 20, 2011

(65) Prior Publication Data

US 2012/0320036 A1    Dec. 20, 2012

(30) Foreign Application Priority Data

Jun. 17, 2011 (KR) ........................ 10-2011-0059162

(51) Int. Cl.
G09G 5/02       (2006.01)
G09G 3/36       (2006.01)
H04N 13/00      (2006.01)
H04N 13/04      (2006.01)

(52) U.S. Cl.
CPC .............. *G09G 3/36* (2013.01); *H04N 13/0025* (2013.01); *H04N 13/0037* (2013.01); *H04N 13/0434* (2013.01); *H04N 13/0438* (2013.01); G09G 2320/0233 (2013.01); G09G 2320/0242 (2013.01)
USPC ........................................................ 345/600

(58) Field of Classification Search
CPC .......... H04N 13/0025; H04N 13/0037; H04N 13/0438; H04N 13/434; G09G 3/36
See application file for complete search history.

(56) References Cited

U.S. PATENT DOCUMENTS

| | | | | |
|---|---|---|---|---|
| 5,428,720 A | * | 6/1995 | Adams, Jr. | 345/604 |
| 5,483,259 A | * | 1/1996 | Sachs | 345/600 |
| 5,602,679 A | * | 2/1997 | Dolgoff et al. | 359/640 |
| 5,886,675 A | * | 3/1999 | Aye et al. | 345/7 |
| 6,061,153 A | * | 5/2000 | Sugita | 358/518 |
| 6,072,464 A | * | 6/2000 | Ozeki | 345/603 |
| 6,128,022 A | * | 10/2000 | Dillinger | 345/591 |
| 6,208,348 B1 | * | 3/2001 | Kaye | 345/419 |
| 6,259,426 B1 | * | 7/2001 | Harada et al. | 345/581 |
| 6,340,994 B1 | * | 1/2002 | Margulis et al. | 348/625 |

(Continued)

FOREIGN PATENT DOCUMENTS

| | | |
|---|---|---|
| CN | 1400823 A | 3/2003 |
| CN | 1692655 A | 11/2005 |

(Continued)

OTHER PUBLICATIONS

Fang Cheng et al., Dynamic Backlight Gamma on High Dyamic Range LCD TVs, Jun. 2008, Journal of Display Technology, vol. 4, No. 2.*

(Continued)

*Primary Examiner* — Devona Faulk
*Assistant Examiner* — Charles L Beard
(74) *Attorney, Agent, or Firm* — Morgan, Lewis & Bockius LLP (57) ABSTRACT

A stereoscopic image display device includes an image divider unit for dividing a stereoscopic image into a left-eye image and a right-eye image, an image correction unit for correcting color temperature for the left-eye and right-eye images and correcting the brightness for the color-temperature-corrected left-eye and right-eye images, an image synthesis unit for synthesizing the left-eye and right-eye images, and an image display panel for displaying the stereoscopic image on the basis of the stereoscopic image outputted through the image synthesis unit.

9 Claims, 5 Drawing Sheets

(56) References Cited

U.S. PATENT DOCUMENTS

| | | | |
|---|---|---|---|
| 6,344,900 B1* | 2/2002 | Hidaka | 358/1.9 |
| 6,504,551 B1* | 1/2003 | Takashima et al. | 345/649 |
| 6,532,008 B1* | 3/2003 | Guralnick | 345/419 |
| 6,573,932 B1* | 6/2003 | Adams et al. | 348/224.1 |
| 6,639,631 B1* | 10/2003 | Hall et al. | 348/744 |
| 6,687,003 B1* | 2/2004 | Sorensen et al. | 356/402 |
| 7,002,623 B1* | 2/2006 | Ohyama et al. | 348/225.1 |
| 7,342,721 B2* | 3/2008 | Lukyanitsa | 359/462 |
| 7,408,573 B2* | 8/2008 | Ishii et al. | 348/223.1 |
| 7,480,083 B2* | 1/2009 | Takahashi et al. | 358/474 |
| 7,676,403 B2* | 3/2010 | Crutchfield et al. | 705/26.1 |
| 7,786,967 B2* | 8/2010 | Kim et al. | 345/89 |
| 7,860,339 B2* | 12/2010 | Yamashita et al. | 382/274 |
| 8,165,417 B2* | 4/2012 | Yamashita et al. | 382/274 |
| 8,194,119 B2* | 6/2012 | Ramstad | 348/51 |
| 8,447,099 B2* | 5/2013 | Wang et al. | 382/154 |
| 8,509,519 B2* | 8/2013 | Wang | 382/154 |
| 8,542,246 B2* | 9/2013 | Saigo et al. | 345/592 |
| 8,547,391 B2* | 10/2013 | Maxik et al. | 345/590 |
| 8,593,476 B2* | 11/2013 | Demos | 345/589 |
| 8,704,848 B2* | 4/2014 | Liu et al. | 345/596 |
| 8,736,630 B2* | 5/2014 | Zhang | 345/589 |
| 8,797,354 B2* | 8/2014 | Noge | 345/633 |
| 2002/0163529 A1* | 11/2002 | Evanicky | 345/600 |
| 2003/0020736 A1 | 1/2003 | Kimura et al. | |
| 2003/0156077 A1* | 8/2003 | Balogh | 345/6 |
| 2004/0041905 A1* | 3/2004 | Shibayama | 348/47 |
| 2004/0061707 A1 | 4/2004 | Yoshida | |
| 2004/0150583 A1* | 8/2004 | Fukushima et al. | 345/6 |
| 2006/0263758 A1* | 11/2006 | Crutchfield, et al. | 434/367 |
| 2007/0052699 A1* | 3/2007 | Karman et al. | 345/419 |
| 2007/0120972 A1 | 5/2007 | Kim et al. | |
| 2007/0159476 A1* | 7/2007 | Grasnick | 345/419 |
| 2007/0188711 A1* | 8/2007 | Sharp et al. | 353/8 |
| 2007/0285554 A1* | 12/2007 | Givon | 348/340 |
| 2008/0002910 A1* | 1/2008 | Ojima et al. | 382/277 |
| 2008/0055546 A1* | 3/2008 | DeCusatis et al. | 353/7 |
| 2008/0074717 A1* | 3/2008 | Blonde et al. | 358/520 |
| 2008/0218856 A1* | 9/2008 | Saishu et al. | 359/464 |
| 2008/0278574 A1* | 11/2008 | Ramstad | 348/51 |
| 2008/0297456 A1* | 12/2008 | Marcu et al. | 345/88 |
| 2008/0316303 A1* | 12/2008 | Chiu et al. | 348/51 |
| 2009/0060380 A1* | 3/2009 | Bujold et al. | 382/275 |
| 2009/0097745 A1* | 4/2009 | Kim et al. | 382/167 |
| 2009/0103178 A1* | 4/2009 | Woodgate et al. | 359/465 |
| 2009/0153652 A1* | 6/2009 | Barenbrug | 348/54 |
| 2009/0160931 A1* | 6/2009 | Pockett et al. | 348/42 |
| 2009/0201309 A1* | 8/2009 | Demos | 345/589 |
| 2009/0238456 A1* | 9/2009 | Fukasawa | 382/167 |
| 2009/0244387 A1* | 10/2009 | Lee et al. | 348/674 |
| 2009/0257102 A1* | 10/2009 | Silverbrook | 358/498 |
| 2009/0278982 A1* | 11/2009 | Imai et al. | 348/453 |
| 2010/0060185 A1* | 3/2010 | Van Duijneveldt | 315/287 |
| 2010/0060857 A1* | 3/2010 | Richards et al. | 353/7 |
| 2010/0118045 A1* | 5/2010 | Brown Elliott et al. | 345/589 |
| 2010/0156955 A1* | 6/2010 | Kimura | 345/690 |
| 2010/0201719 A1* | 8/2010 | Kimura | 345/690 |
| 2010/0220178 A1* | 9/2010 | Takahashi et al. | 348/54 |
| 2010/0225836 A1* | 9/2010 | Ockenfuss | 349/15 |
| 2010/0290697 A1* | 11/2010 | Benitez et al. | 382/154 |
| 2011/0007132 A1* | 1/2011 | Redmann et al. | 348/42 |
| 2011/0012920 A1* | 1/2011 | Saigo et al. | 345/601 |
| 2011/0012992 A1* | 1/2011 | Luthra et al. | 348/43 |
| 2011/0032340 A1* | 2/2011 | Redmann et al. | 348/51 |
| 2011/0069281 A1* | 3/2011 | Redmann | 353/7 |
| 2011/0080496 A1* | 4/2011 | Givon | 348/222.1 |
| 2011/0096071 A1* | 4/2011 | Okamoto et al. | 345/419 |
| 2011/0109620 A1* | 5/2011 | Hong et al. | 345/419 |
| 2011/0129144 A1* | 6/2011 | Takahashi et al. | 382/154 |
| 2011/0134109 A1* | 6/2011 | Izumi | 345/419 |
| 2011/0210964 A1* | 9/2011 | Chiu et al. | 345/419 |
| 2011/0234605 A1* | 9/2011 | Smith et al. | 345/522 |
| 2011/0255160 A1* | 10/2011 | Lee et al. | 359/464 |
| 2011/0279749 A1* | 11/2011 | Erinjippurath et al. | 349/61 |
| 2011/0285705 A1* | 11/2011 | Ellinger et al. | 345/419 |
| 2011/0292045 A1* | 12/2011 | Nakamura et al. | 345/419 |
| 2011/0316848 A1* | 12/2011 | Newton et al. | 345/419 |
| 2011/0316973 A1* | 12/2011 | Miller et al. | 348/43 |
| 2012/0002123 A1* | 1/2012 | Kang | 349/15 |
| 2012/0038632 A1* | 2/2012 | Matsunaga et al. | 345/419 |
| 2012/0075484 A1* | 3/2012 | Kawamoto et al. | 348/207.1 |
| 2012/0154558 A1* | 6/2012 | Ahn et al. | 348/54 |
| 2012/0176409 A1* | 7/2012 | Noge | 345/633 |
| 2012/0212484 A1* | 8/2012 | Haddick et al. | 345/419 |
| 2012/0268506 A1* | 10/2012 | Ramstad | 345/694 |
| 2012/0280990 A1* | 11/2012 | Ramstad | 345/419 |
| 2012/0286700 A1* | 11/2012 | Maxik et al. | 315/312 |
| 2012/0299907 A1* | 11/2012 | Kim et al. | 345/419 |
| 2012/0320036 A1* | 12/2012 | Kang | 345/419 |
| 2013/0002660 A1* | 1/2013 | Chikazawa | 345/419 |
| 2013/0009955 A1* | 1/2013 | Woo et al. | 345/419 |
| 2013/0070064 A1* | 3/2013 | Bickerstaff | 348/51 |
| 2013/0093805 A1* | 4/2013 | Iversen | 345/690 |
| 2013/0120234 A1* | 5/2013 | Atkins | 345/102 |
| 2013/0135298 A1* | 5/2013 | Isogai et al. | 345/419 |
| 2014/0092120 A1* | 4/2014 | Demos | 345/589 |

FOREIGN PATENT DOCUMENTS

| | | |
|---|---|---|
| CN | 101014137 A | 8/2007 |
| CN | 101188777 A | 5/2008 |

OTHER PUBLICATIONS

Kim et al., CN Pub No. 101014137, 2007.*
Pai, CN Pub No. 101188777, 2008.*
Office Action dated Jan. 6, 2014, issued by the State Intellectual Property Office for Chinese Patent Application No. 201110424055.1.
Office Action dated Sep. 17, 2014, issued by the State Intellectual Property Office of China in Chinese Patent Application No. 201110424055.1.

\* cited by examiner

STEREOSCOPIC IMAGE DISPLAY DEVICE AND DRIVING METHOD THEREOF

This application claims the benefit of Korean Patent Application No. 10-2011-0059162 filed on Jun. 17, 2011, which is hereby incorporated by reference.

BACKGROUND

1. Field

This document relates to a stereoscopic image display device and a driving method thereof.

2. Related Art

A stereoscopic image display device is classified into a stereoscopic technique and an autostereoscopic technique.

The stereoscopic technique is implemented using parallax images of left and right eyes having the most reliable three dimensional effects. The stereoscopic technique is classified into a glasses method and a non-glasses method, both of which are commercialized. The glasses method displays left and right parallax images on a direct-view liquid crystal display panel or projector in a time-divisional manner by changing polarization direction of the left and right parallax images, and implements a stereoscopic image using polarization glasses or liquid-crystal shutter glasses. In general, the non-glasses method is a method which obtains a stereoscopic image by separating the optical axes of left and right parallax images using an optical plate such as a parallax barrier and the like.

As described above, the most important factors for displaying the stereoscopic image on the stereoscopic image display device are color temperature and luminance components according to an exposure of a camera in the obtaining state of the image.

However, the prior stereoscopic image display device processes and outputs a synthesized image of left-eye and right-eye images in the same processing manner. For this reason, the prior stereoscopic image display device causes a competition phenomenon between the left-eye and right-eye images and thereby reduces the display quality of the stereoscopic image when the color property values of the left-eye and right-eye images are different from each other in an intermediate image processing state after obtaining the stereoscopic image. Accordingly, faces with this situation, clearly further improvement is required.

SUMMARY

According to an exemplary embodiment of this document, there is provided a stereoscopic image display device including: an image divider unit for dividing a stereoscopic image into a left-eye image and a right-eye image; an image correction unit for correcting color temperature for the left-eye and right-eye images and correcting the brightness for the color-temperature-corrected left-eye and right-eye images; an image synthesis unit for synthesizing the left-eye and right-eye images; and an image display panel for displaying the stereoscopic image on the basis of the stereoscopic image outputted through the image synthesis unit.

According to an exemplary embodiment of this document, there is provided a method for driving a stereoscopic image display device including: an image dividing step of dividing a stereoscopic image into a left-eye image and a right-eye image; an image correcting step of correcting color temperature for the left-eye and right-eye images and correcting the brightness for the color-temperature-corrected left-eye and right-eye images; an image synthesizing step of synthesizing the left-eye and right-eye images; and an image outputting step of outputting the synthesized image.

BRIEF DESCRIPTION OF THE DRAWINGS

The accompany drawings, which are comprised to provide a further understanding of the invention and are incorporated on and constitute a part of this specification illustrate implementations of the invention and together with the description serve to explain the principles of the invention.

DETAILED DESCRIPTION

Reference will now be made in detail implementations of the invention examples of which are illustrated in the accompanying drawings.

Hereinafter, an implementation of this document will be described in detail with reference to the attached drawings.

Figure 1:
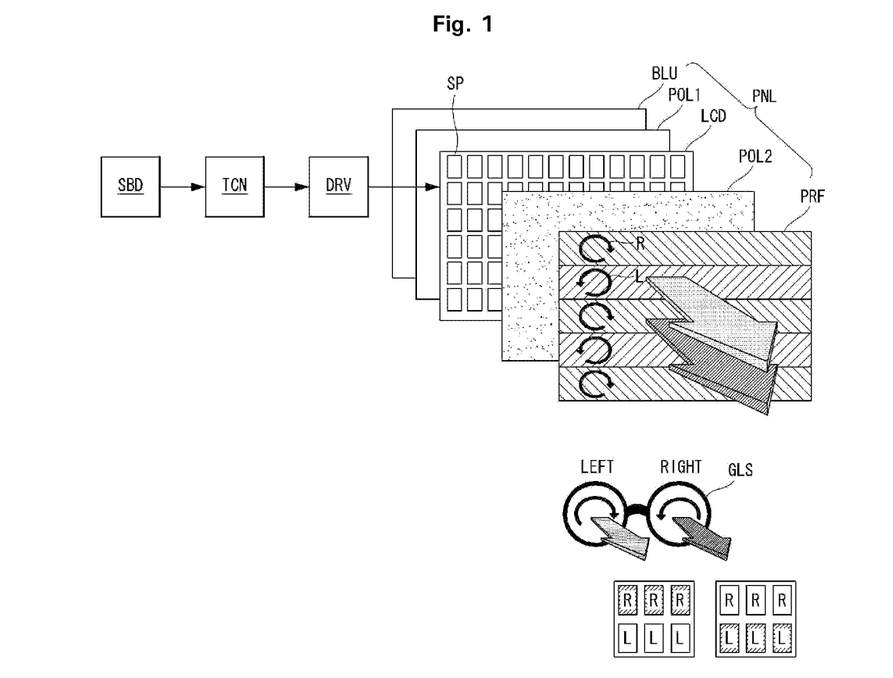
FIG. 1 is a schematic structure diagram of a stereoscopic image display device.
Figure 2:
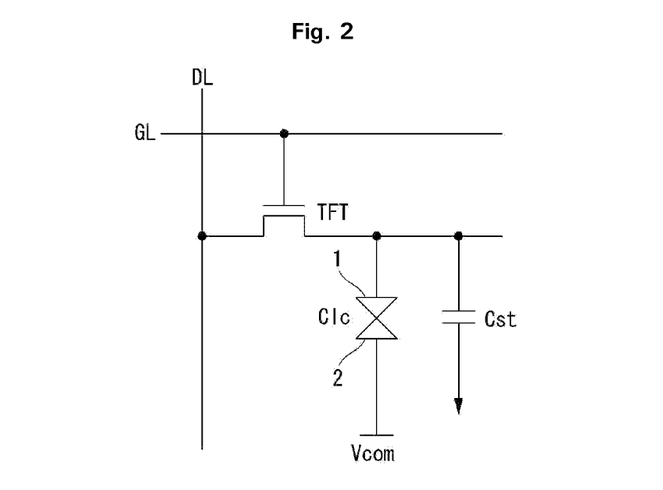
FIG. 2 is an exemplary circuit structure diagram of a sub-pixel.

FIG. 1 is a schematic structure diagram of a stereoscopic image display device and FIG. 2 is an exemplary circuit structure diagram of a sub-pixel.

As shown in FIGS. 1 and 2, a stereoscopic image display device includes an image processing unit SBD, a timing control unit TCN, a driving unit DRV, a liquid crystal display panel LCD, a pattern retarder PRF, and glasses GLS.

The image processing unit SBD generates a normal image (hereinafter, 2D image) in a two-dimensional mode 2D mode and generates a stereoscopic image (hereinafter, 3D image) in a three-dimensional mode. The image processing unit SBD supplies timing signals such as a vertical synchronous signal Vsync, a horizontal synchronous signal Hsync, a data enable signal DE, a main clock Main Clock, and the like and a 2D or 3D image to the timing control unit TCN.

The image processing unit SBD generates and processes a corresponding image in the 2D mode or 3D mode selected according to a choice of a user inputted through a user interface and supplies the processed image to the timing control unit TCN. The user interface includes a user input unit such as an On Screen Display (OSD), a remote controller, a keyboard, a mouse, and the like. Hereinafter, the image processing unit SBD which is selected in the 3D mode and supplies the 3D image to the timing control unit TCN will be explained.

The timing control unit TCN receives the 3D image including a left-eye image and a right-eye image received from the image processing unit SBD. The timing control unit TCN alternately supplies the left-eye and right-eye images at a frame frequency of at least 120 Hz to the driving unit DRV. In addition, the timing control unit TCN supplies a control signal corresponding to the image to the driving unit DRV.

The driving unit DRV includes a data driving part connected to data lines to supply data signals and a gate driving part connected to gate lines to supply gate signals. The data driving part included in the driving unit DRV converts digital type left-eye and right-eye images to analog type left-eye and right-eye images under the control of the timing control unit TCN and supplies the converted images to the data lines. In addition, the gate driving part included in the driving unit DRV sequentially supplies the gate signals to the gate lines under the control of the timing control unit TCN.

A LCD panel LCD receives the gate signals and the data signals from the driving unit DRV and displays the 2D or 3D image. The LCD panel includes a Thin Film Transistor (TFT) substrate in which TFTs and capacitors and the like are formed and a color filter substrate in which a color filter and a black and the like are formed. A sub-pixel SP including a liquid crystal layer formed between the TFT substrate and the color filter substrate.

The sub-pixels SP include a red sub-pixel, a green sub-pixel, a blue sub-pixel and the like. As shown in FIG. 2, a general circuit structure of one sub-pixel includes a TFT, a storage capacitor Cst, and a liquid crystal layer Clc. The TFT includes a source electrode connected to a data line DL to which a data signal is supplied and a gate electrode connected to a gate line GL to which a gate signal is supplied. The storage capacitor Cst and the liquid crystal layer Clc are connected to the drain electrode of the TFT and receive a common voltage supplied through a common voltage line Vcom. The liquid crystal layer Clc is driven by a difference between a data voltage supplied to a pixel electrode 1 and a common voltage supplied to a common electrode 2. The common electrode is formed on the color substrate in a vertical field drive method such as a Twisted Nematic TN mode and a Vertical Alignment VA mode. The common electrode and the pixel electrode 1 are formed on the TFT substrate in a horizontal field drive method such as an In Plane Switching (IPS) mode and a Fringe Field Switching (FFS) mode.

A liquid crystal mode of a LCD panel LCD can be formed in any modes as well as the TN mode, the VA mode, the IPS mode, and the FFS mode. A lower polarization plate POL1 and an upper polarization plate POL2 are attached to the TFT substrate and the color filter substrate of the LCD panel LCD, respectively. The LCD panel can display the image by the light provided from a backlight unit BLU.

The backlight unit BLU is driven by the control of the image processing unit SBD or the timing control unit TCN to provide the light for the LCD panel LCD. The backlight unit BLU includes a light source for emitting the light, a light guide plate for guiding the light emitted from the light source to the LCD panel, an optical member for diffusing and collecting the light emitted from the light guide plate, and the like.

The backlight unit BLU is formed with an edge type, a dual type, a quad type, a direct type, and the like. The edge type is a type wherein the light source is arranged in one side of the LCD panel LCD. The dual type is a type wherein the light sources are arranged opposite to each other at both sides of the LCD panel LCD. The quad type is a type wherein the light sources are arranged in four directions of the LCD panel LCD. The direct type is a type wherein the light source is arranged at a lower part of the LCD panel LCD.

The pattern retarder PRF mixes the left-eye and right-eye images displayed on the LCD panel in a line-by-line and displays the mixed image in an interlace manner. To achieve the above, the pattern retarder PRF separates the image displayed on the LCD panel by polarizing an odd-numbered line in a right source polarization and polarizing an even-numbered line in a left source polarization (or otherwise).

The glasses GLS play a role of dividing the image outputted through the pattern retarder into the left-eye and right-eye images. The glasses GLS are selected as polarization glasses in which polarization characteristics of a left-eye glass and a right-eye glass are opposite to each other. Accordingly, only the left-eye image passes through the left-eye glass LEFT and only the right-eye image passes through the right-eye glass RIGHT.

As described above, the backlight unit BLU, the LCD panel LCD, and the pattern retarder PRF are integrated devices for displaying the image and are thus defined as an image display panel PNL in the description of the present invention.

Meanwhile, in the above description, the panel including the backlight unit BLU and the LCD panel LCD is described as an example but only the panel for displaying the image like an organic electroluminescent display panel, a plasma panel, and a field emission display panel is possible. However, for the sake of convenient explanation, the present invention will be described on the basis of the LCD panel LCD.

Hereinafter, the detailed explanation will focus on the schematic structure of the image display panel and the expression of the 3D image in the image display panel.

Figure 3:
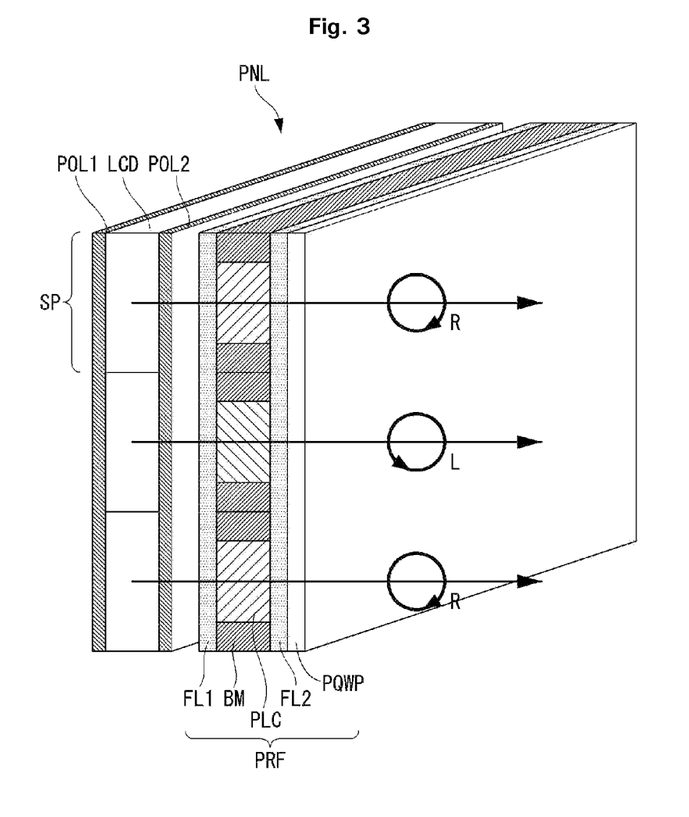
FIG. 3 is a schematic structure diagram of an image display panel.
Figure 4:
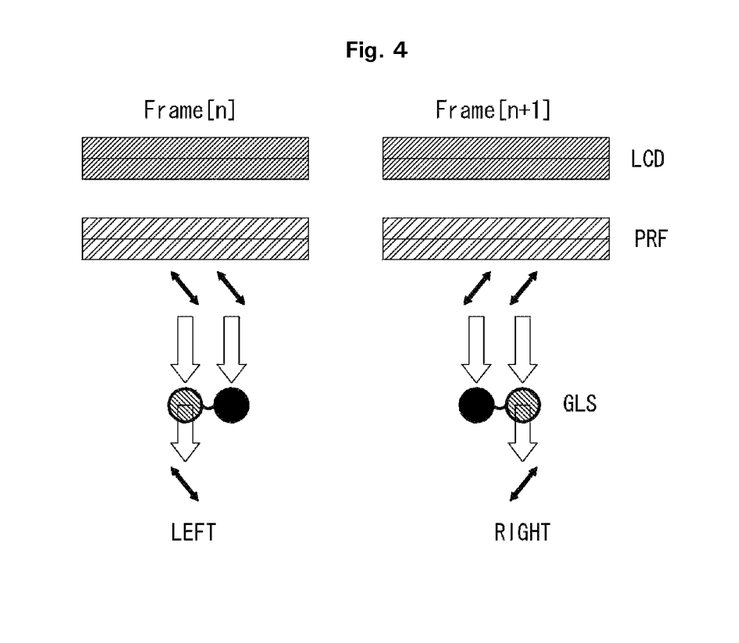
FIG. 4 is a view for explaining a 3D image expression method.

FIG. 3 is a schematic structure diagram of the image display panel and FIG. 4 is a view for explaining a 3D image expression method.

As described in FIGS. 3 and 4, the image display panel PNL includes the LCD panel LCD for displaying the image and the pattern retarder PRF which is attached to a display surface of the LCD panel LCD and divides the image into the left-eye image and the right-eye image in each frame. The backlight unit is omitted therein.

The pattern retarder includes a first film FL1, a second film FL2, black matrixes BM, a retarder liquid crystal layer PLC, and a λ/4 plate PQWP. The first film FL1 and the second film FL2 are attached to each other and the black matrixes BM and the retarder liquid crystal layer PLC are formed therebetween. The black matrixes BM are positioned between the first film FL1 and the second film FL2 and are separated in the horizontal direction of the LCD panel liquid crystal and are divided to be positioned in a boundary area between the sub-pixels SP. The λ/4 plate PQWP is attached to one surface of the second film FL2 through which the image received through the LCD panel is outputted.

The pattern retarder PRF divides the image displayed on the LCD panel by polarizing the odd-numbered line in the right source polarization R and the even-numbered line in the left source polarization L (or otherwise).

The stereoscopic image display device is a stereoscopic image display device using the pattern retarder PRF. In the stereoscopic image display device, the pattern retarder PRF separately outputs the left-eye image and the right-eye image when the left-eye image and the right-eye image are alternately displayed on the LCD panel.

Accordingly, a user sees the left-eye image through the left-eye glass LEFT in a first frame [n] and sees the right-eye image through the right-eye glass LIGHT in a second frame [n+1]. Through the above manner, the left-eye image and the right-eye image are alternately displayed on a time axis and the user can appreciate the 3D image through the glasses GLS.

Meanwhile, as described above, the most important factors for displaying the 3D stereoscopic image on the stereoscopic image display device are color temperature and luminance components according to an exposure of a camera in the obtaining state of the image.

Accordingly, the exemplary embodiment of the invention derives a parameter for color correction by extracting main factors of colors from the obtained left-eye and right-eye images. And, a part which causes a competition phenomenon between the images through the correction for the left-eye and right-eye images is compensated within a permissible error range. Accordingly, the stereoscopic image display device can express the colors considering the peripheral environment, can obtain a 3D color characteristic similar to a processed result for the 2D image, and can improve picture quality.

In the description of the prevent invention, the stereoscopic image display device using the pattern retarder is explained as an example. However, the present invention can commonly used in the stereoscopic image display device using various compositions such as shutter glasses, a liquid crystal lens, a lenticular lens, shutter glasses, and the like.

Hereinafter, the image processing unit SBD as a main part of the stereoscopic image display device according to one embodiment of the present invention will be explained in detail.

Figure 5:
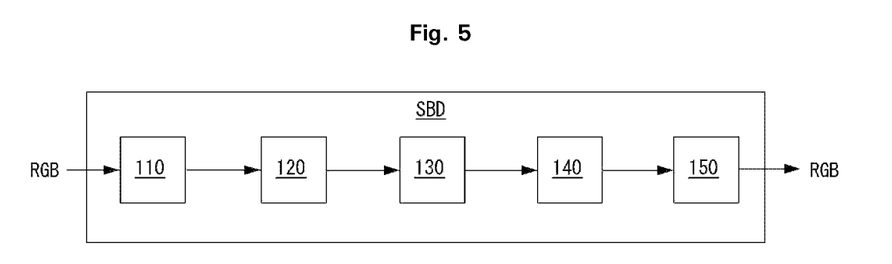
FIG. 5 is a schematic block diagram of an image processing unit according to one embodiment of the present invention.
Figure 6:
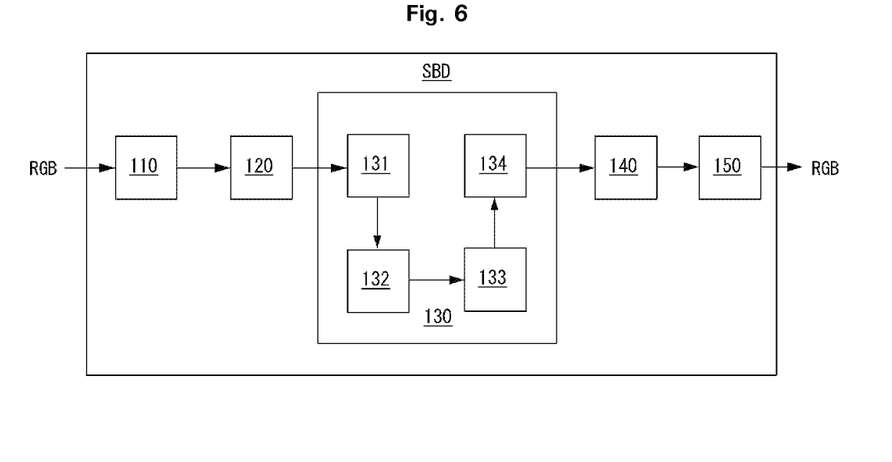
FIG. 6 is a detailed block diagram of an image processing unit illustrated in FIG. 5.

FIG. 5 is a schematic block diagram of an image processing unit according to one embodiment of the present invention and FIG. 6 is a detailed block diagram of an image processing unit illustrated in FIG. 5.

As shown in FIGS. 5 and 6, the image processing unit SBD according to one embodiment of the present invention includes an image divider unit 110, an image correction unit 130, and an image synthesis unit 150. The normal 3D image is inputted as the type of RGB. Thus, as an example of the embodiment of the present invention, the image processing unit SBD includes an image conversion unit 120 for normalizing the RGB type left-eye and right-eye images inputted through the image processing unit SBD in a CIE XYZ color space, converting the CIE XYZ color space into a CIE Yxy color space, and transferring the converted images to the image correction unit and an image inverse-conversion unit 140 for inversely-converting the left-eye and right-eye images brightness-corrected through the image correction unit 130 into the RGB type images again and transferring the inversely-converted images to the image synthesis unit 150.

The image divider unit 110 divides the 3D image into the left-eye and right-eye images. The 3D image is the synthesized state of the left-eye and right-eye images. Accordingly, the image divider unit 110 divides the RGB type synthesized 3D image into the left-eye and right-eye images and transfers the left-eye and right-eye images to the image conversion part unit so as to efficiently correct the images by using the left-eye and right-eye images.

The image conversion unit 120 normalizes the divided left-eye and right-eye images in the CIE XYZ color space, converting the CIE XYZ color space into the CIE Yxy color space, and transferring the converted images to the image correction unit 130.

The image correction unit 130 corrects the color temperature for the left-eye and right-eye images and corrects the brightness for the color-temperature-corrected left-eye and right-eye images. More specifically, the image correction unit 130 corrects the color temperature according to whether a white color difference between the left-eye and right-eye images satisfies a reference color difference threshold value. And the image correction unit 130 corrects the brightness according to whether the brightness difference between the color-temperature-corrected left-eye and right-eye images satisfies the reference brightness threshold value.

To achieve the above, the image correction unit 130 includes a color difference derivation part 131, a color temperature correction part 132, a brightness difference deduction part 133, and a brightness correction part 134. The color difference derivation part 131 derives the white color difference between the left-eye and right-eye images by deriving a white area for the left-eye and right-eye images. The color temperature correction part 132 corrects the color temperature according to whether the derived white color difference satisfies the reference color difference threshold value. The bright difference derivation part 133 detects the brightness difference between the color-temperature-corrected left-eye and right-eye images. The brightness correction part 134 corrects the brightness according to whether the detected brightness difference satisfies the reference brightness threshold value.

The color temperature correction part 132 corrects the color temperature for only one of the left-eye and right-eye images when the derived white color difference dissatisfies the reference color difference threshold value.

The brightness correction part 134 corrects the brightness by multiplying the color-temperature-corrected left-eye and right-eye images by a gain. The brightness correction part 134 corrects the brightness on the basis of a relational expression of $0 \leq \text{gain} < 2$.

The image inverse-conversion unit 140 inversely converts the brightness-corrected left-eye and right-eye images into the RGB type images again and transfers the inversely-converted images to the image synthesis unit 150. The left-eye and right-eye images are divided by the image correction unit 130 and are corrected in the state which converted into the CIE Yxy color space. Accordingly, the image inverse-conversion unit 140 inversely converts the brightness-corrected left-eye and right-eye images into the RGB type images again.

The image synthesis unit 150 synthesizes the left-eye and right-eye images. As the images transmitted from the image inverse-conversion unit 140 is divided by the image divider unit 130, the image synthesis unit 150 synthesizes the left-eye and right-eye images again to output the brightness-corrected left-eye and right-eye images as the synthesized RGB type 3D image.

As described above, as the color temperature and the brightness of the 3D image are corrected by an image processing state of the image processing unit SBD, the image display panel displays the 3D image on the basis of the corrected 3D image.

Figure 7:
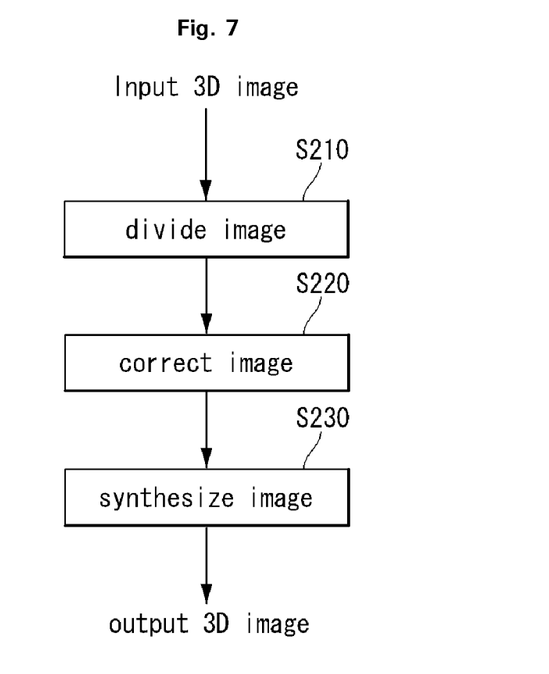
FIG. 7 is a flow chart for schematically explaining a method for driving a stereoscopic image display device according to one embodiment of the present invention.
Figure 8:
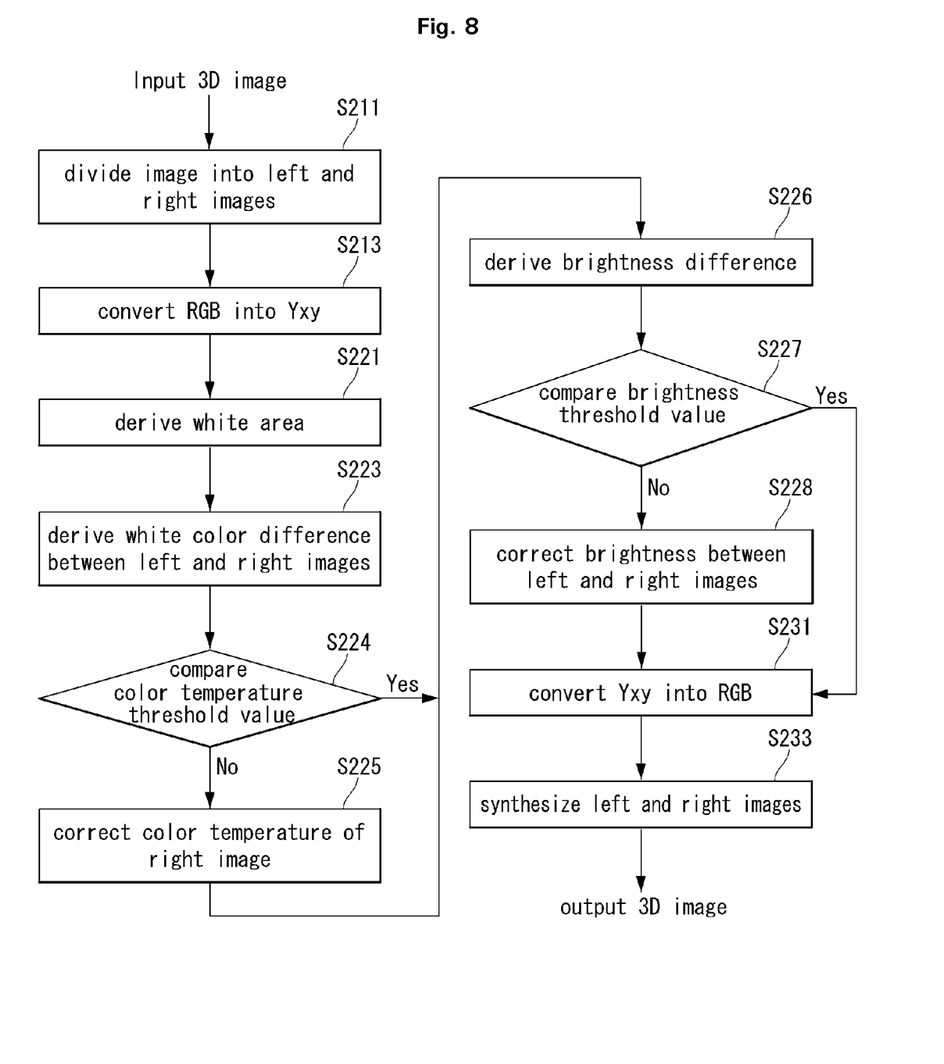
FIG. 8 is a flow chart for specifically explaining the driving method of FIG. 7.

FIG. 7 is a flow chart for schematically explaining a method for driving a stereoscopic image display device according to one embodiment of the present invention and FIG. 8 is a flow chart for specifically explaining the driving method of FIG. 7.

As shown in FIG. 7, the method for driving the stereoscopic image display device according to one embodiment of the present invention includes: an image dividing step S210 of dividing the inputted 3D image into the left-eye and right-eye images; an image correcting step S220 of correcting the color temperature for the left-eye and right-eye images and correcting the brightness for the color-temperature-corrected left-eye and right-eye images; and an image synthesizing step S230 of synthesizing the left-eye and right-eye images.

The method for driving the stereoscopic image display device according to one embodiment of the present invention, particularly the method for processing the image by the image processing unit will be explained in detail.

As shown in FIGS. 7 and 8, the 3D image is normally inputted as the RGB type image. Accordingly, the image dividing step S210 includes the step S211 of dividing the inputted RGB type 3D image into the left-eye and right-eye images and the step S213 of normalizing the left-eye and right-eye images in the CIE XYZ color space and converting the CIE XYZ color space into the CIE Yxy color space. The image correcting step S220 includes the steps S211-S228 of correcting the brightness from a color difference deriving step to process the image. The image synthesizing step S230 includes the step S231 of inversely converting the brightness-corrected left-eye and right-eye images into the RGB type images and the step S233 of synthesizing the left-eye and right-eye images.

First, the inputted RGB type 3D image is divided into the left-eye image and the right-eye image S211.

Next, the divided left-eye and right-eye images are converted into the CIE Yxy color space S213. To achieve the above, the left-eye image and the right-eye image are normalized in the CIE XYZ color space by the mathematical expression 1 and are converted into the CIE Yxy color space by the mathematical expression 2.

[Mathematical Expression 1]

$$\begin{bmatrix} X \\ Y \\ Z \end{bmatrix} = \begin{bmatrix} 0.430574 & 0.341550 & 0.178325 \\ 0.2220.15 & 0.706655 & 0.071330 \\ 0.020183 & 0.129553 & 0.939180 \end{bmatrix} \begin{bmatrix} R \\ G \\ B \end{bmatrix}$$

[Mathematical Expression 2]

$$Y = Y, \quad x = \frac{X}{X+Y+Z}, \quad y = \frac{Y}{X+Y+Z}$$

As described above, the conversion method is the method based on ITU standard and the method for converting the RGB type left-eye and right-eye images into the CIE Yxy color space. In the mathematical expression 1, RGB is a linear value. In the mathematical expression 2, the color space expressed as Yxy is widely used as the usage for substantially expressing the colors and a color distribution table thereof is normal and is thus omitted.

Next, a white area of each of the converted left-eye and right-eye images is derived S221.

The white area of each of the converted left-eye and right-eye images is derived by mathematical expressions 3 and 4. The relationship between a white color temperature curve value yw and an offset value offset y corresponds to the mathematical expression 3 and the area derived from the white area can be set by differently setting relevant values (0.015, 25). The white color temperature curve value yw for deriving the white area is derived by the mathematical expression 4.

offset $y < y_w \pm 0.015$, and $Y > 25$  [Mathematical Expression 3]

$y_w = -3x_w^2 + 2.870x_w - 0.275$  [Mathematical Expression 4]

Next, the white area is derived and a white color difference between the left-eye and right-eye images is derived S223. The white color difference between the left-eye and right-eye images $\Delta xy$ is derived by an absolute value for an average of the left-eye image average($xy_{Left}$) and an average of the right-eye image average($xy_{Right}$) like the mathematical expression 5.

$\Delta xy = |\text{average}(xy_{Left}) - \text{average}(xy_{Right})|$  [Mathematical Expression 5]

Next, the color temperature is corrected according to whether the derived white color difference $\Delta xy$ satisfies the reference colors threshold value $\Delta xy_{TH}$ S225. At this time, the derived white color difference is compared with the reference colors threshold value $\Delta xy_{TH}$ S224. The brightness difference is derived when the derived white color difference $\Delta xy$ does not satisfy the reference color difference threshold value $\Delta xy_{TH}$ S226. The color temperature is corrected when the derived white color difference $\Delta xy$ dissatisfies the reference colors threshold value $\Delta xy_{TH}$ S225. The comparison between the derived white color $\Delta xy$ and the reference color threshold value $\Delta xy_{TH}$ can be expressed as $\Delta xy > \Delta xy_{TH}$.

Meanwhile, in the color temperature correction process S225 only one selected from the left-eye image and the right-eye image is corrected. In the present invention, like the following mathematical expression 6, the correction for only the right-eye image is described as an example. The mathematical expression 6 expresses a white right-eye $X_W^R$/white left-eye $X_W^L$ correction matrix for an input $(X_{in}, Y_{in}, Z_{in})$ considering an output $(X_{out}, Y_{out}, Z_{out})$ in a color temperature correction process

[Mathematical Expression 6]

$$\begin{bmatrix} X_{out} \\ Y_{out} \\ Z_{out} \end{bmatrix} = \begin{bmatrix} \frac{X_w^R}{X_w^L} & 0 & 0 \\ 0 & \frac{Y_w^R}{Y_w^L} & 0 \\ 0 & 0 & \frac{Z_w^R}{Z_w^L} \end{bmatrix} \begin{bmatrix} X_{in} \\ Y_{in} \\ Z_{in} \end{bmatrix}$$

Next, the brightness difference between the color-temperature-corrected left-eye and right-eye images is derived S226. The brightness difference between the color-temperature-corrected left-eye and right-eye images can be derived from an absolute value difference between a left-eye luminance average average($Y_{Left}$) and a right-eye luminance average average($Y_{Right}$) like the following mathematical expression 7. That is, the brightness difference between the color-temperature-corrected left-eye and right-eye images can be derived by using Average Picture Level (APL).

$\Delta Y = |\text{average}(Y_{Left}) - \text{average}(Y_{Right})|$  [Mathematical Expression 7]

Next, the brightness is corrected according to whether the detected brightness difference satisfies the reference brightness threshold value S225. At this time, the detected brightness difference $\Delta Y$ is compared with the reference brightness threshold value $Y_{TH}$ S227. The Yxy is converted to the RGB without correction when the detected brightness difference $\Delta Y$ satisfies the reference brightness threshold value S231. The brightness of the left and right images is corrected when the detected brightness difference dissatisfies the reference brightness threshold value $Y_{TH}$ S228. The comparison between the detected brightness difference $\Delta Y$ and the reference brightness threshold value $Y_{TH}$ can be expressed as $\Delta Y > T_{TH}$.

Meanwhile, in the brightness correction process S228 for the left and right images, at least one of the left-eye image and the right-eye image are corrected. In the present invention, only the right-eye image is corrected as an example like the following mathematical expression. As shown in the mathematical expression 8, in the brightness correction process S228 for the left and right images, the brightness can be corrected by multiplying the color-temperature-corrected right-eye image $Y_{Right}$ by the gain. At this time, the gain has a relational expression of $0 \leq \text{gain} < 2$.

$Y_{Right} = \text{gain} \times Y_{Right}, 0 \leq \text{gain} < 2$  [Mathematical Expression 8]

The brightness is corrected on the basis of the above relational expression since the corrected color is differently formed in comparison with the desired color when the range of the gain is wide in the color temperature correction process. More correctly, the brightness correction part 134 can correct the brightness of the left-eye and right-eye images within a range of saturation values on the basis of the relational expression 1≤gain<1.5.

Next, the brightness-corrected left-eye and right-eye images are inversely converted into the RGB type S231. The brightness-corrected left-eye and right-eye images can be completed by inversely performing the color space conversion performed through the mathematical expression 1 like the following mathematical expression 9. In the mathematical expression 9, the inversely converted RGB is the linear value and the inversely converted method is the method based on the ITU D65 standard.

[Mathematical Expression 9]

$$\begin{bmatrix} R \\ G \\ B \end{bmatrix} = \begin{bmatrix} 0.430574 & 0.341550 & 0.178325 \\ 0.222015 & 0.706655 & 0.071330 \\ 0.020183 & 0.129553 & 0.939180 \end{bmatrix}^{-1} \begin{bmatrix} X \\ Y \\ Z \end{bmatrix}$$

Next, the left-eye and right-eye images are synthesized S233. The left-eye and right-eye images are synthesized and are displayed as the 3D image on the image display panel.

As described above, the present invention can express the colors considering the peripheral environment by preventing the competition phenomenon between the images through the correction for the left-eye and right-eye images and can improve the picture quality by obtaining the 3D characteristics similar to the processed result of the 2D image when wearing the glasses. In addition, the present invention can appreciate the convenient image by using a peculiar image processing method for maximizing the color picture quality and reduces the 3D image manufacturing cost and easily propagates 3D contents by easily performing the prior 3D image correction process using the post-processing.

The foregoing implementations and advantages are merely exemplary and are not to be construed as limiting this document. The present teaching can be readily applied to other types of apparatuses. The description of the foregoing implementations is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A stereoscopic image display device, comprising:
    an image processing unit, comprising:
        an image divider unit configured to divide a stereoscopic image into a left-eye image in a first color space and a right-eye image in the first color space;
        an image synthesis unit configured to synthesize the left-eye and right-eye images in the first color space into a stereoscopic image;
        a stereoscopic image correction unit configured to perform a series of steps comprising;
            normalize inputted left-eye and right-eye images in the first color space into second color space images;
            correct color temperature for the left-eye and right-eye images in a second color space; convert the second color space images into third color space images;
            correct a brightness for the color-temperature-corrected left-eye and right-eye images in a third color space;
            correct the color temperature for the left-eye and right-eye images in the third color space;
            convert the color-corrected third color space images into color-corrected second color space images;
            correct the brightness for the color-corrected left-eye and right-eye images in the second color space;
            convert the brightness-corrected and color-corrected second color space images into brightness-corrected first color space images;
            transfer the brightness-corrected and color-corrected first color space images to the image synthesis unit; and
    an image display panel configured to display the stereoscopic image outputted by the image synthesis unit, wherein the stereoscopic image correction unit is configured to:
        correct the color temperature according to whether a white color difference between the left-eye and right-eye images satisfies a reference color difference threshold value, and
        correct the brightness according to whether a brightness difference between the color-temperature-corrected left-eye and right-eye images satisfies a reference brightness threshold value, and wherein:
        the first color space is an RGB color space,
        the second color space is a CIE XYZ color space, and
        the third color space is a CIE Yxy color space.

2. The stereoscopic image display device of claim 1, wherein the image correction unit comprises:
    a color difference derivation part configured to derive the white color difference between the left-eye and right-eye images by deriving a white area for the left-eye and right-eye images;
    a color temperature correction part configured to correct the color temperature according to whether the derived white color difference satisfies a reference color difference threshold value;
    a bright difference derivation part configured to detect a brightness difference between the color-temperature-corrected left-eye and right-eye images; and
    a brightness correction part configured to correct the brightness according to whether the detected brightness difference satisfies a reference brightness threshold value.

3. The stereoscopic image display device of claim 2, wherein the color temperature correction part corrects the color temperature for only one of the left-eye and right-eye images when the derived white color difference dissatisfies the reference color difference threshold value.

4. The stereoscopic image display device of claim 2, wherein the brightness correction part corrects the brightness by multiplying the color-temperature-corrected left-eye and right-eye images by a gain.

5. The stereoscopic image display device of claim 4, wherein the gain has a relational expression of 0≤gain<2.

6. A method for driving a stereoscopic image display, the method comprising:
    an image dividing operation of dividing a stereoscopic image into a left-eye image in a first color space and a right-eye image in the first color space;

a stereoscopic image correction operation of perform a series of steps:
  normalizing inputted left-eye and right-eye images in the first color space into second color space images;
  correcting color temperature for the left-eye and right-eye images in a second color space;
  converting the second color space images into third color space images;
  correcting a brightness for the color-temperature-corrected left-eye and right-eye images in a third color space;
  correcting the color temperature for the left-eye and right-eye images in the third color space;
  converting the color-corrected third color space images into color-corrected second color space images;
  correcting the brightness for the color-corrected left-eye and right-eye images in the second color space;
  converting the brightness-corrected and color-corrected second color space images into brightness-corrected first color space images;
an image synthesizing operation of synthesizing the brightness-corrected and color-corrected first color space left-eye and right-eye images; and
an image outputting operation of outputting the synthesized image on a stereoscopic display,
wherein the stereoscopic image correcting operation further comprises:
  deriving a white area of each of the converted left-eye and right-eye images,
  deriving a white color difference between the left-eye and right-eye images,
  correcting the color temperature according to whether the derived white color difference satisfies a reference color difference threshold value,
  deriving a brightness difference between the color-temperature-corrected left-eye and right-eye images, and
  correcting the brightness according to whether the detected brightness difference satisfies a reference brightness threshold value, and wherein:
  the first color space is an RGB color space,
  the second color space is a CIE XYZ color space, and
  the third color space is a CIE Yxy color space.

7. The method for driving a stereoscopic image display of claim 6, wherein the operation of correcting the color temperature is to correct the color temperature for only one of the left-eye image and the right-eye image when the derived white color difference dissatisfies the reference color difference threshold value.

8. The method for driving a stereoscopic image display of claim 6, wherein the operation of correcting the brightness comprises correcting the brightness by multiplying the color-temperature-corrected left-eye and right-eye images by a gain.

9. The method for driving a stereoscopic image display of claim 8, wherein the gain has a relational expression of $0 \leq gain < 2$.

* * * * *